United States Patent
McCoy et al.

(10) Patent No.: US 7,267,253 B2
(45) Date of Patent: Sep. 11, 2007

(54) MULTIPOSITIONAL APPARATUS FOR MOUNTING TO A RECEIVER ASSEMBLY

(75) Inventors: Richard W. McCoy, Granger, IN (US); Jason R. Moldthan, Osceola, IN (US); Katherine A. Adams, Mishawaka, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 100 days.

(21) Appl. No.: 10/415,063

(22) PCT Filed: Oct. 2, 2001

(86) PCT No.: PCT/US01/30705

§ 371 (c)(1), (2), (4) Date: Apr. 24, 2003

(87) PCT Pub. No.: WO02/34570

PCT Pub. Date: May 2, 2002

(65) Prior Publication Data

US 2004/0011837 A1      Jan. 22, 2004

Related U.S. Application Data

(60) Provisional application No. 60/243,388, filed on Oct. 26, 2000.

(51) Int. Cl.
B60R 11/00 (2006.01)

(52) U.S. Cl. ............... 224/509; 224/499; 224/502; 224/524; 414/462; 108/44

(58) Field of Classification Search ............ 224/499, 224/502, 504–506, 508, 519–521, 524, 42.32, 224/553, 509; 108/44; 414/462
See application file for complete search history.

(56) References Cited

U.S. PATENT DOCUMENTS

| | | | | |
|---|---|---|---|---|
| 1,242,828 A | * | 10/1917 | Lyle | 105/448 |
| 1,977,734 A | * | 10/1934 | Monckmeier | 224/508 |
| 2,500,815 A | * | 3/1950 | Gerli et al. | 182/2.7 |
| 3,757,975 A | | 9/1973 | Sneider | |
| 3,768,837 A | | 10/1973 | Reese | |
| 4,744,590 A | * | 5/1988 | Chesney | 224/521 |
| 4,909,700 A | * | 3/1990 | Fontecchio et al. | 414/549 |
| 4,915,276 A | * | 4/1990 | Devito | 224/521 |

(Continued)

OTHER PUBLICATIONS

U.S. Appl. No. 60/194,502, filed Apr. 3, 2000; Trailer Hitch Assembly With Accessory Ports.

(Continued)

*Primary Examiner*—Tri M. Mai
(74) *Attorney, Agent, or Firm*—McDonald Hopkins LLC; Robert H. Earp, III (57) ABSTRACT

A multipositionable apparatus for mounting on a receiver assembly carried by a vehicle includes a support frame, a platform carried on the support frame and a linkage for displaceably mounting the platform relative to the frame and positively holding the platform in at least two different positions.

19 Claims, 5 Drawing Sheets

U.S. PATENT DOCUMENTS

| | | | |
|---|---|---|---|
| 5,029,740 A * | 7/1991 | Cox | 224/521 |
| 5,106,002 A * | 4/1992 | Smith et al. | 224/508 |
| 5,215,234 A * | 6/1993 | Pasley | 224/508 |
| 5,330,312 A * | 7/1994 | Allsop et al. | 224/521 |
| 5,456,564 A * | 10/1995 | Bianchini | 224/508 |
| 5,527,146 A | 6/1996 | Allsop et al. | |
| 5,685,686 A | 11/1997 | Burns | |
| 5,730,345 A * | 3/1998 | Yeckley et al. | 224/505 |
| 5,771,815 A * | 6/1998 | Leftwich | 108/44 |
| 6,145,447 A * | 11/2000 | Henderson | 108/44 |
| 6,164,895 A * | 12/2000 | Croswell | 414/462 |
| 6,189,458 B1 | 2/2001 | Rivera | |

OTHER PUBLICATIONS

U.S. Appl. No. 60/243,486, filed Oct. 26, 2000; Multiple Accessory Port Assembly for a Vehicle.

* cited by examiner

MULTIPOSITIONAL APPARATUS FOR MOUNTING TO A RECEIVER ASSEMBLY

This is a U.S. National Stage Application of International Patent Application Ser. No. PCT/US01/30705 filed Oct. 2, 2001 which claims the benefit of U.S. Provisional Application Ser. No. 60/243,388 filed Oct. 26, 2000.

TECHNICAL FIELD

The present invention relates generally to accessories for mounting on receiver assemblies and, more particularly, to a multipositional apparatus for mounting on an accessory receiver of a receiver assembly that may function as an article carrier, table or serve some other desired purpose.

BACKGROUND OF THE INVENTION

It has long been known to construct towing hitches that are mounted to vehicles in order to allow the towing of trailers or the like. In recent years such hitches have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 35365 as manufactured by Reese Products, Inc. of Elkhart, Ind. Such a hitch receiver is also disclosed in, for example, U.S. Pat. No. 3,768,837 to Reese, owned by Reese Products, Inc.

Recent efforts to enhance the versatility of a hitch receiver have led to development of various accessories (e.g., both open and closed article carriers, bike racks, ski racks, tables, winches or other equipment) mounted by means of an accessory mounting bar in the receiver box of a trailer hitch receiver assembly. Because of their convenience and suitability to the particular applications/interests of the user, such accessories have become very popular.

In order to allow for or accommodate trailer towing and accessory mounting simultaneously, a trailer hitch assembly with both a trailer hitch receiver and towing accessory ports has been recently developed and is the subject of U.S. Patent Application Ser. Nos. 60/194,502, filed Apr. 3, 2000 and 60/243,486 filed Oct. 26, 2000. This new trailer hitch receiver assembly includes a central frame member, a mounting bracket carried on each end of the central frame member for securing the central frame member to the vehicle, a hitch receiver box carried on the central frame member and at least one accessory receiver for receiving and holding a recreational and/or utilitarian accessory.

The present invention relates to a multipositional apparatus particularly adapted for mounting in a receiver box and/or accessory receiver of a receiver assembly. The apparatus includes a selectively positionable platform that provides multiple functions and because of its versatility is suited to a multitude of useful applications.

SUMMARY OF THE INVENTION

In accordance with the purposes of the present invention as described herein, a multipositionable apparatus is provided for mounting to a receiver assembly. The apparatus includes a support frame, a platform carried on the support frame and a linkage for displaceably mounting the platform relative to the support frame and positively holding the platform in at least selected first and second positions.

More specifically describing the invention, the linkage is a parallelogram linkage. The linkage includes a pair of cooperating linkage sets. Each linkage set includes a link arm and a support arm. Further, the platform includes a pair of mounting brackets with one of the pair of mounting brackets being pivotally engaged by one of the pair of linkage sets.

Each of the link arms is pivotally mounted at a first point to the support frame and at a second point to the platform. Similarly, each of the support arms is pivotally mounted at a third point to the support frame and at a fourth point to the platform. More particularly, the link arm and support arm of each of the pair of linkage sets is pivotally secured to one of the pair of brackets.

Each of the support arms includes an arcuate guide surface and at least two latching notches interrupting the guide surface. Additionally, the apparatus includes a latch bar received in a latch bar slot provided in each of the pair of mounting brackets. The latch bar is also received in one of the at least two latching notches in each of the pair of support arms in order to positively retain the platform in one of the selected first and second positions. A spring biases the latch bar from a release position into a latching position. The spring has a first end engaging the latch bar and a second end engaging one of the support arms.

In the embodiment illustrated the support arms each include a third notch for latching the platform in a third selected position. Further, the support frame includes first and second mounting tubes for securing to the receiver assembly.

As should be appreciated, a single embodiment is shown and described in this patent application. That single embodiment is an illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
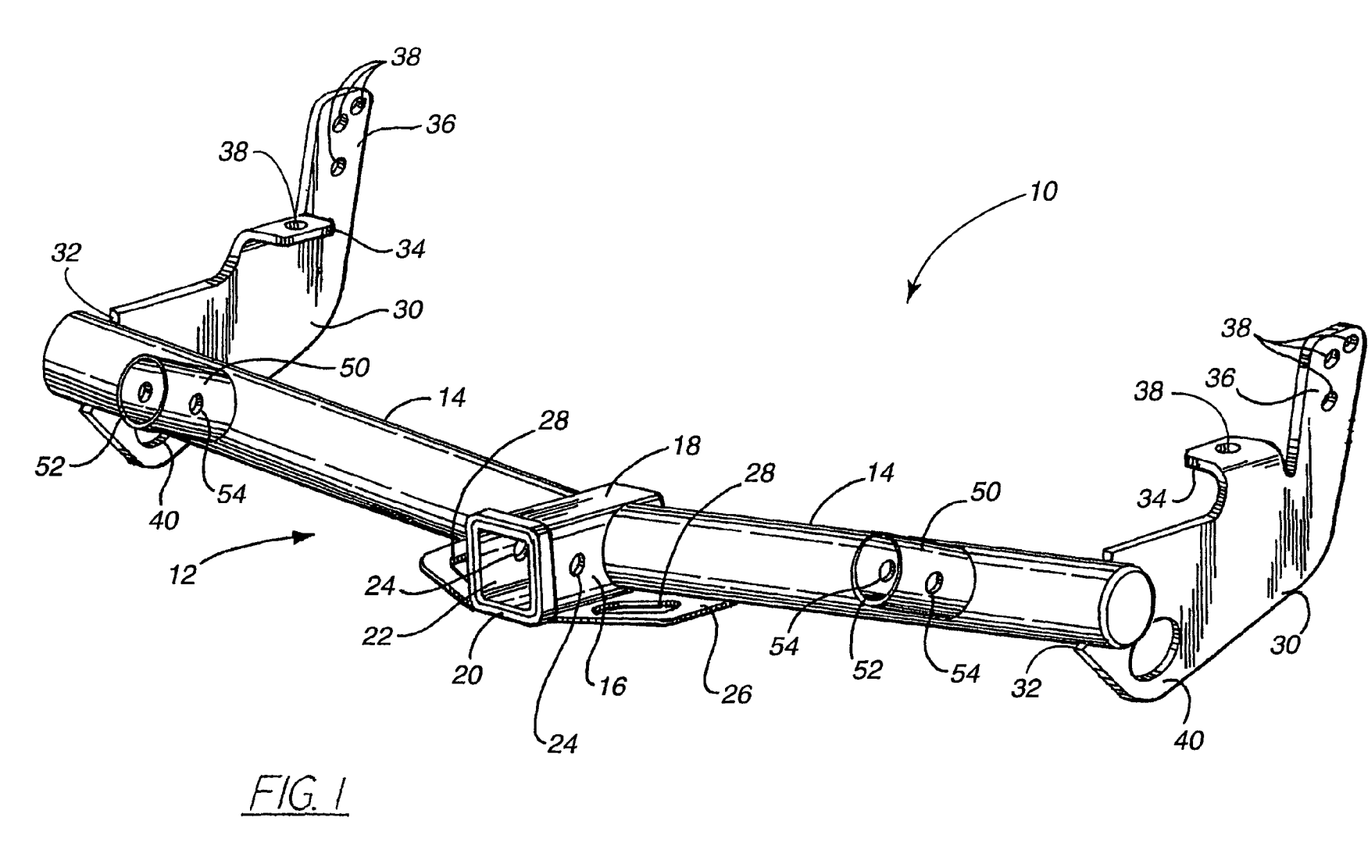
FIG. 1 is a perspective view showing a receiver assembly of the type to which the apparatus of the present invention may be secured.
Figure 2:
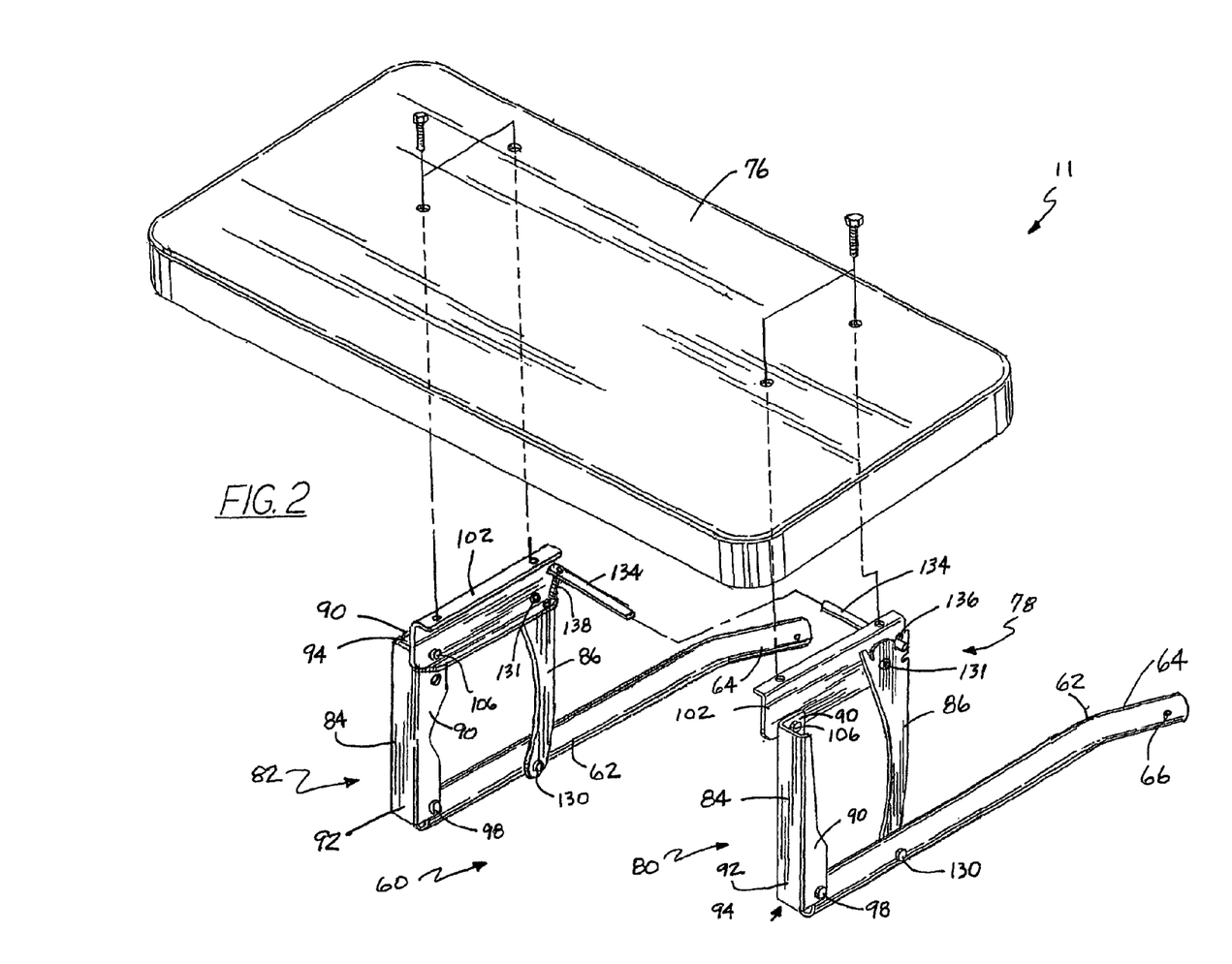
FIG. 2 is an exploded perspective view of the multipositional apparatus of the present invention.

Reference is now made to FIG. 1 showing a receiver assembly, generally designated by reference numeral 10 and to FIG. 2 showing the multipositional apparatus of the present invention, generally designated by reference numeral 11.

The receiver assembly 10 includes a central frame member or cross member 12 preferably formed from a pair of tubular steel sections 14 welded to the opposing side walls 16 of a centrally located receiver box 18 so as to project outwardly in opposing directions. The tubular steel sections 14 may be formed with a round cross section as shown in the drawing figures, a square cross section or any other appropriate shape providing the necessary strength to function as a receiver assembly.

The receiver box 18 includes a reinforced lip 20 defining an opening leading to a hitch bar receiving cavity 22. Aligned apertures 24 in the opposing side walls 16 of the receiver box 18 allow the secure connection of a hitch bar in the receiver box in a manner well known in the art by means of a connecting pin and cooperating pin clip generally designated by reference numeral 25. A chain plate 26 of steel material is welded to the receiver box 18 and tubular steel sections 14 in order to strengthen the connection. As is known in the art, chain plate 26 includes two apertures 28. The safety chains of a trailer may be connected to the chain plate 26 through engagement in these apertures 28.

Vehicle mounting brackets 30 are mounted adjacent the distal end of each tubular section 14. More specifically, each mounting bracket 30 includes a notch 32 sized and shaped to receive the tubular section 14. The brackets 30 are welded to the tubular sections 14 in order to complete the connection. The mounting brackets 30 each include a mounting flange 34 and an upwardly projecting mounting lug 36, both with apertures 38. Nut and bolt fasteners (not shown) are extended through these apertures 38 and cooperating apertures drilled in the frame of the towing vehicle in order to mount the receiver assembly 10 thereto.

As also shown in FIG. 1, the receiver assembly 10 incorporates a pair of tow hooks or loops 40, one integrally formed in each mounting bracket 30. The tow hooks 40 may be engaged with a tow line such as a rope, chain or cable in order to complete certain towing applications. As also shown, the receiver assembly 10 includes a pair of accessory receivers 50 carried on the tubular sections 14 of the central frame member 12. Each of the accessory receivers 50 is formed from a steel tube that is welded to the section 14 so that one accessory receiver is positioned between the receiver box 18 and each mounting bracket 30.

As shown, each accessory receiver 50 includes a circular port or opening 52 and cooperating aligned apertures 54 in the sidewall thereof to allow secure connection of a trailer hitch accessory by means of a connecting pin and pin clip of a type well known in the art such as utilized to secure the hitch bar in the receiver box 18. Each of the accessory receivers 50 is oriented to open upwardly with respect to the central frame member 12, receiver box 18 and the vehicle upon which the receiver assembly 10 is mounted so as to be readily accessible by the towing vehicle operator.

As best shown in FIG. 2, the apparatus 11 of the present invention includes a support frame generally designated by reference numeral 60. The support frame 60 includes first and second cooperating mounting tubes 62. Each mounting tube 62 includes a proximal end 64 sized and shaped for receipt in the circular port 52 of one of the accessory receivers 50 of the receiver assembly 10. Each proximal end 64 also includes a pair of aligned mounting apertures 66 provided at opposed sides thereof. When the distal end 64 of each mounting tube 62 is properly inserted and seated in one of the accessory receivers 50, the mounting apertures 66 are aligned with the cooperating apertures 54 in the sidewall of the accessory receiver 50 in which the tube 62 is mounted. A pin (not shown) of the type known in the art is then inserted through the aligned apertures 54, 66 and a cooperating pin clip is utilized to secure the pin in position and complete the connection.

A platform 76 of e.g. metal, such as steel or aluminum, or molded plastic or fiberglass is carried on and selectively positionable with respect to the support frame 60. As best shown with reference to FIG. 2, the platform 76 includes a pair of depending mounting brackets 102. Each mounting bracket 102 may be welded, bolted or otherwise fastened to the platform 76. More specifically, a linkage, generally designated by reference numeral 78 is provided for displaceably mounting the platform 76 relative to the support frame 60 and positively holding the platform in at least selected first and second positions described in greater detail below.

The linkage 78 is a parallelogram linkage including a pair of cooperating linkage sets 80, 82. Only one of the linkage sets 80 will be described in detail below. It should be appreciated, however, that the linkage set 82 is identical in every respect except one: linkage set 80 has a lefthand orientation while the other linkage set 82 has a right-hand orientation (i.e. the linkage sets 80, 82 are mirror images of each other).

The linkage set 80 includes a link arm 84 and a support arm 86. The link arm 84 is pivotally mounted at a first point to the mounting tube 62 of the support frame 60. More specifically, the link arm 84 includes a pair of sidewalls 90 and a connecting wall 92 forming a channel 94. Each of the sidewalls 90 includes a pin receiving aperture. The apertures in the two opposing sidewalls 90 are aligned. The link arm 84 is positioned so that the end of the mounting tube 62 is received in the channel 94 between the sidewalls 90 so as to provide a more stable connection. A pivot pin 98 passes through the apertures in the link arm 84 and aligned apertures provided in the sidewall of the mounting tube 62 to complete the connection. Any appropriate retaining mechanism may be utilized to hold the pivot pin 98 in place.

As further shown, the link arm 84 includes an aperture in one of the opposing sidewalls 90 at a second point allowing mounting of the link arm 84 to the platform 76. Specifically, a pivot pin 106 is passed through the aperture in the wall of the mounting bracket 102 and the apertures in the link arm 84 to complete the connection. Any appropriate retaining mechanism known in the art may be utilized to hold the pivot pin 106 in place.

Figure 5:
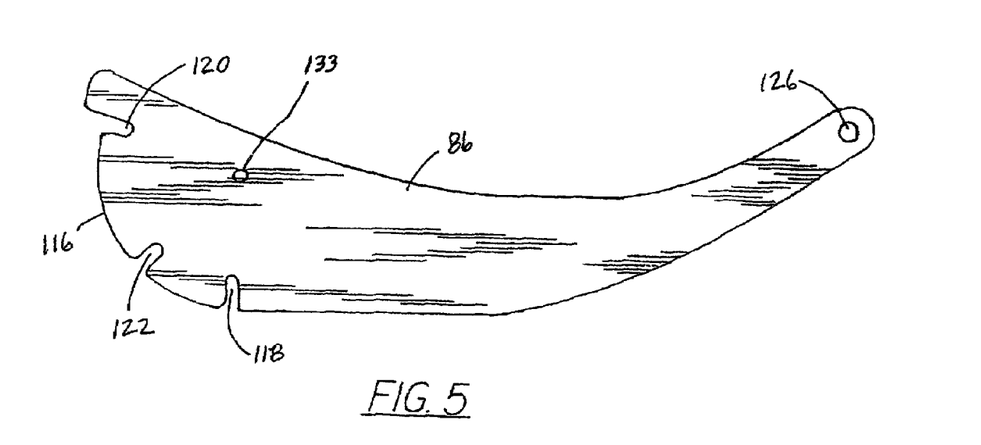
FIG. 5 is a detailed side elevational view of a support arm.

As shown in FIG. 5, support arm 86 may be made from a planer sheet of steel or other appropriate high strength material. Support arm 86 includes an arcuate guide surface or edge 116 at one end thereof (see also FIG. 5). In the embodiment shown the guide surface 116 includes three latching notches 118, 120, 122. Each latching notch 118, 120, 122 allows the platform 76 to be secured and held in a selected position as will be described in greater detail below. Accordingly, the multipositionable apparatus 11 of the present invention must include at least two latching notches although more than two or the three illustrated could be provided. As shown, each latching notch 118, 120, 122 interrupts the edge or guide surface 116.

The support arm 86 is mounted at a third point to the support frame 60. More specifically, the support arm 86 includes an aperture 126 in one end thereof that is aligned with a pair of aligned apertures in the sidewall of the mounting tube 62. A pivot pin 130 is received in the apertures 126 in the support arm 86 and the apertures in the mounting tube 62 to complete the connection. Any appropriate retaining mechanism known in the art may be utilized to hold the pivot pin in place.

The support arm 86 is pivotally connected at a fourth point to the platform 76 through the mounting bracket 102. More particularly, a pivot pin 131 is utilized to complete the connection. Specifically, the pivot pin 131 is passed through aligned cooperating aperture 133 in the second end of the support arm 86 and aperture 136 in the bracket 102. Any appropriate retaining mechanism known in the art may be utilized to hold the pivot pin 131 in place. It should be appreciated that the linkage set 80, together through the link arm 84 and support arm 86, forms a parallelogram linkage between the support frame 60 and more particularly the mounting tube 62, and the platform 76 and more particularly the mounting bracket 102. The linkage set 82 forms a similar parallelogram linkage arrangement between the opposite mounting tube 62 and the opposite mounting bracket 102 at the other side of the apparatus 11.

Figures 4A, 4B:
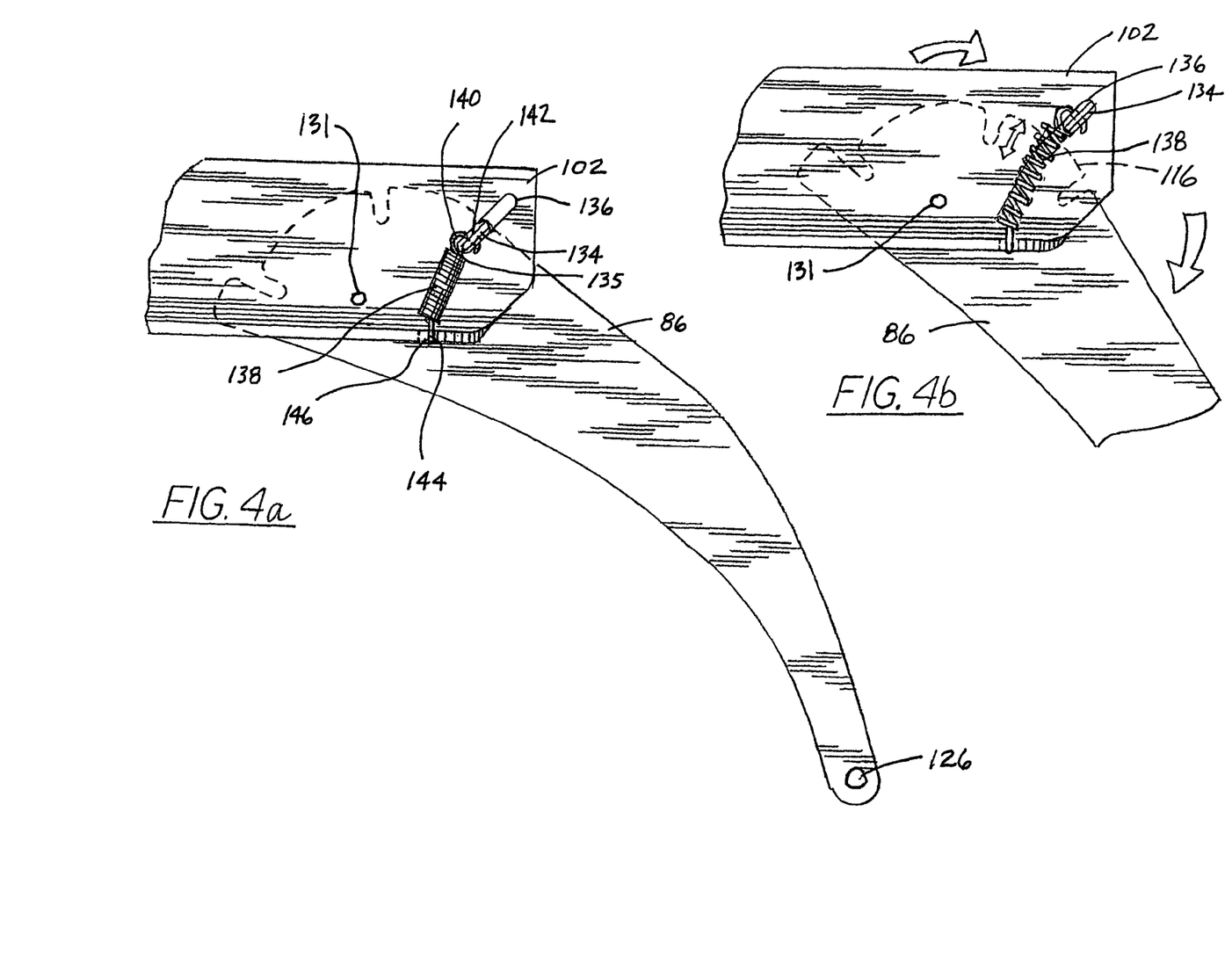
FIGS. 4a and 4b are detailed side elevational views showing, respectively, the latch bar in the latching position and in the release position.

The platform 76 may be secured in any one of a multiple number of positions with respect to the support frame 60 by means of a latch bar 134. The latch bar 134 may be constructed from metal, such as aluminum or steel, or even molded from plastic or fiberglass. Each bracket 102 secured to the platform 76 includes an elongated latch bar receiving slot 136. Accordingly, each of the two ends of the latch bar 134 is received in a latch bar receiving slot 136 provided in one of the mounting brackets 102. A tension spring 138 is provided to bias the latch bar 134 from a release position shown in FIG. 4*b* into a latching position shown in FIG. 4*a*. The spring 138 is secured at a first end 140 in an aperture 142 in the latch bar 134 and at a second end 144 in an aperture 146 or formed in the bracket 102. A second spring is mounted in the same manner between the other bracket 102 and the other end of the latch bar 134.

With the latch bar 134 biased by the springs 138 into the latching position, it should be appreciated that the latch bar also passes through one of the latching notches 118, 120, 122 provided in each of the support arms 86. Accordingly, it should be appreciated that the latch bar 134 may be utilized to positively secure and hold the platform 76 in any of the three positions illustrated in FIGS. 3*a*-3*c*. More particularly, when the latch bar 134 is secured in the latching notch 120, the platform 76 is secured in a first or lowered position (see FIG. 3*a*). When the latch bar 134 is received in the latching notch 122, the platform 76 is secured in a second or raised position (see FIG. 3*b*). Finally, when the latch bar is received in the latching notch 118, the platform 76 is secured in a third, intermediate height position (see FIG. 3*c*).

Figure 3A:
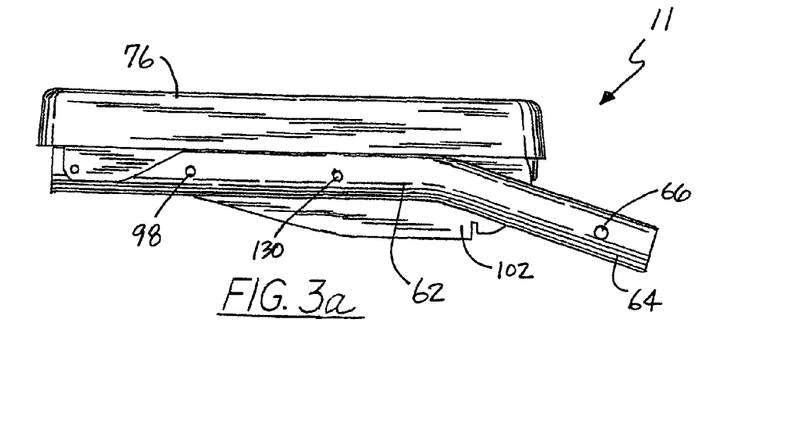
FIGS. 3a-3c are side elevational views showing three different positions in which the platform of the apparatus of the present invention may be positively secured by receipt of the latch bar in one of three latching notches provided in each of the support arms.
Figure 3B:
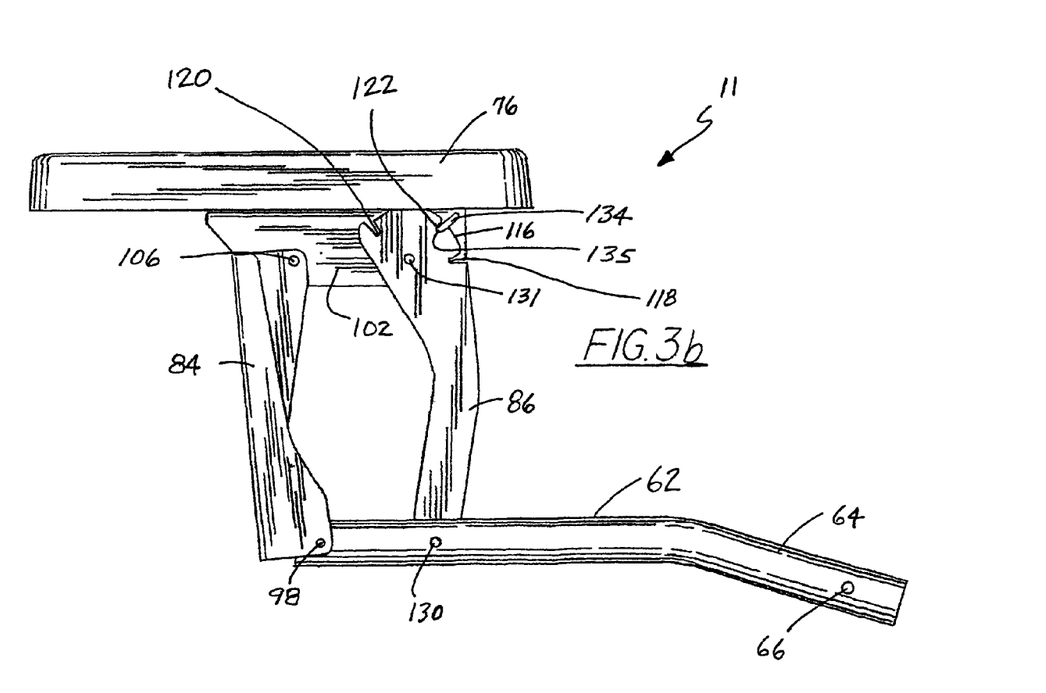
Figure 3C:
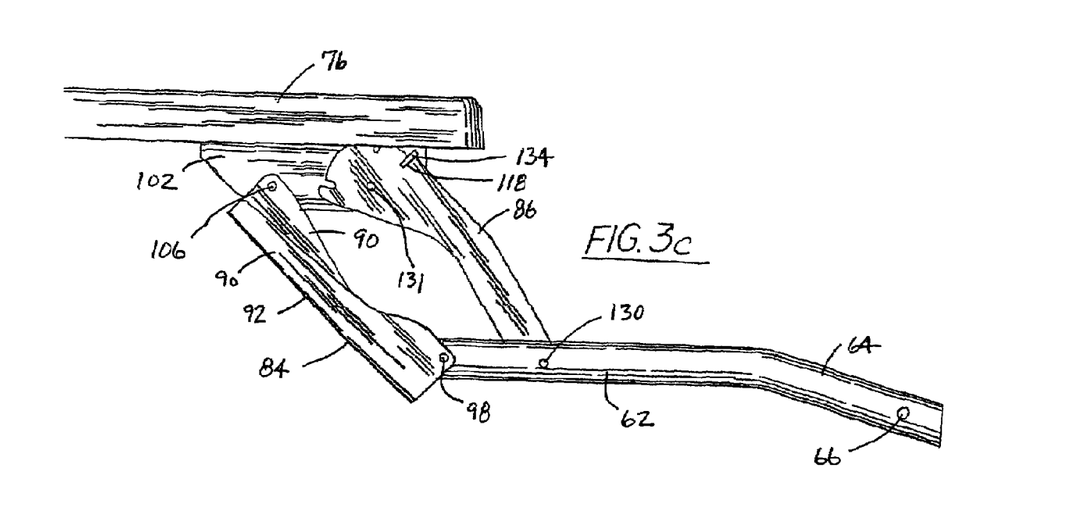

In order to release the platform 76 for movement relative to the support frame 60 between the three positions shown in drawing FIGS. 3*a*, 3*b* and 3*c*, one manipulates the latch bar 134 by displacing the latch bar along the elongated latch bar receiving slots 136 in the mounting brackets 102 until the latch bar 134 clears the latching slot 118, 120, 122 into which it had been previously biased by the springs 138. With the latch bar 134 note in the release position, the edge of the latch bar clears the latching notches 118, 120, 122 and the platform 76 may be displaced between the positions shown in drawing FIGS. 3*a*-3*c* with the edge 135 of the latch bar sliding along the guide surface 116 until the latch bar is aligned with the next set of latching notches 118, 120 or 122 in the mounting brackets 102.

At that point the springs 138 again bias the latch bar 134 into the aligned latching notch 118, 120 or 122, thereby locking the platform 76 in the next position. In this manner it should be appreciated that the platform 76 may be adjusted and oriented as desired for a particular application. As such, the apparatus of the present invention is particularly versatile and may be used not only as an article carrier but also as, for example, a picnic or work table. As such, the present invention represents a significant advance in the art useful for an infinite number of varying applications.

The foregoing description of the preferred embodiment of this invention has been presented for purposes of illustration and description. It is not intended to be exhaustive or to limit the invention to the precise form disclosed. Obvious modifications or variations are possible in light of the above teachings. For example, the apparatus of the present invention could be mounted by a T-shaped adaptor into the receiver box 18 of a standard hitch receiver assembly. Similarly, the device could be mounted on a simple accessory receiver assembly 10 that does not incorporate a receiver box 18 for holding a hitch bar and, accordingly, is not equipped for trailer towing.

Still further, while the accessory receivers 50 illustrated in the drawing figures are hollow and include ports 52, it should be appreciated that those receivers could just as easily be solid rods or bars so long as the ends 64 of the accessory include a complementary mating structure that allow secure interconnection with the receivers.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A multipositionable apparatus mountable to a receiver assembly comprising:

a support frame mountable to a receiver assembly;

a platform;

a linkage having at least one link arm and at least one support arm, wherein said link arm and said support arm are pivotally connected to said platform and pivotally connected to said support frame to create at least one parallelogram linkage such that said platform translates between a first position and a second position relative to said support frame;

at least two notches located on an exterior edge of said support arm; and a latch bar biased into a latching position within one of said notches, wherein said latch bar is displaceable from said notches to selectively position said platform relative to said support frame.

2. The apparatus of claim 1, wherein said linkage includes a pair of link arms and a pair of support arms.

3. The apparatus of claim 2, wherein said platform includes a pair of mounting brackets, each one of said pair of mounting brackets being pivotally engaged by said linkage.

4. The apparatus of claim 2, wherein each one of said link arms is pivotally mounted at a first point to said support frame and at a second point to said platform.

5. The apparatus of claim 4, wherein each one of said support arm is pivotally mounted at a third point to said support frame and at a fourth point to said platform.

6. The apparatus of claim 5, wherein said platform includes a pair of mounting brackets, said link arm and support arm being pivotally secured to one of said pair of brackets.

7. The apparatus of claim 6, wherein said exterior edge of said support arms is an arcuate guide surface and includes the notches thereon, the notches interrupting said guide surface.

8. The apparatus of claim 6, further including a spring for biasing said latch bar from a release position into a latching position, said spring having a first end engaging said latch bar and a second end engaging one of said mounting brackets.

9. The apparatus of claim 2, wherein each one of said link arms includes a pair of opposed sidewalls and a connecting wall forming a channel.

10. The apparatus of claim 9, wherein said support frame includes first and second mounting tubes for securing to said receiver assembly.

11. The apparatus of claim 10, wherein one of said first and second mounting tubes has a distal end received in said channel.

12. The apparatus of claim 1, further comprising a third notch located on said exterior edge of said support arm wherein said third notch defines a third selectively set position for said platform relative to said support frame.

13. A multipositionable apparatus mountable to a receiver assembly, the apparatus comprising:
    a support frame mountable to a receiver assembly;
    a platform pivotally movable relative to said support frame;
    a pair of link arms and a pair of support arms forming a pair of parallelogram linkages wherein, each of said link arms and said support arms pivotally connects said platform to said support frame,
    at least one of said support arms having at least two notches formed along an exterior edge of said support arm
    a latch bar biased into a latching position within one of said notches; and
    a spring biasing said latch bar into one of said notches, wherein said latch bar is displaceable from each notch to selectively set said platform in a predetermined position relative to said support frame.

14. The apparatus of claim 13, further comprising a third notch along said support arm wherein said third notch defines a third selectively set position for said platform relative to said support frame.

15. The apparatus of claim 13, wherein said platform includes a pair of mounting brackets, wherein the latch bar is received in a latch bar slot provided in each of said mounting brackets.

16. The apparatus of claim 15, wherein said support arm includes an arcuate surface and includes the notches thereon, the notches interrupting said guide surface.

17. A multipositionable apparatus mountable to a receiver assembly comprising:
    a support frame mountable to a receiver assembly;
    a platform;
    a linkage pivotally connected to said platform and pivotally connected to said support frame, wherein said platform translates between a first position and a second position relative to said support frame;
    wherein said linkage includes a pair of cooperating linkage sets, each linkage set including a link arm and a support arm;
    at least two notches along said linkage wherein each notch defines a selectively set position for said platform relative to said support frame;
    a latch bar selectively engagable with one of said notches to move said platform with respect to said support frame; and
    a torsion spring biasing said latch bar into a latching position within one of said notches.

18. The apparatus of claim 17, wherein said platform includes a pair of mounting brackets pivotally engaged by at least one of said pair of linkage sets.

19. The apparatus of claim 18 further comprising a latch bar receiving slot provided in at least one of said pair of mounting brackets, said latch bar being displaceable along said latch bar receiving slot.

* * * * *

UNITED STATES PATENT AND TRADEMARK OFFICE
CERTIFICATE OF CORRECTION

PATENT NO. : 7,267,253 B2
APPLICATION NO. : 10/415063
DATED : September 11, 2007
INVENTOR(S) : Richard W. McCoy, Jason R. Moldthan and Katherine A. Adams It is certified that error appears in the above-identified patent and that said Letters Patent is hereby corrected as shown below:

Column 7, line 33, delete "wherein,each" and insert --wherein each--

Signed and Sealed this

Ninth Day of December, 2008

JON W. DUDAS
*Director of the United States Patent and Trademark Office*